(12) United States Patent
Akiyama

(10) Patent No.: US 7,421,078 B2
(45) Date of Patent: Sep. 2, 2008

(54) VALID MEDIUM MANAGEMENT SYSTEM

(75) Inventor: Ryota Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 10/209,606

(22) Filed: Jul. 30, 2002

(65) Prior Publication Data

US 2003/0142825 A1 Jul. 31, 2003

(30) Foreign Application Priority Data

Jan. 31, 2002 (JP) .............................. 2002-024585

(51) Int. Cl.
- *H04L 9/00* (2006.01)
- *G06F 11/00* (2006.01)
- *G06F 12/14* (2006.01)
- *H04L 9/32* (2006.01)

(52) U.S. Cl. ....................................... 380/277; 713/193
(58) Field of Classification Search .................. 713/193
See application file for complete search history.

(56) References Cited

U.S. PATENT DOCUMENTS

| | | | | |
|---|---|---|---|---|
| 5,805,699 | A | * | 9/1998 | Akiyama et al. ............... 705/58 |
| 6,052,465 | A | * | 4/2000 | Gotoh et al. ............. 369/53.21 |
| 6,144,745 | A | | 11/2000 | Akiyama et al. ............ 380/232 |
| 6,188,659 | B1 | | 2/2001 | Mueller et al. |
| 6,477,530 | B1 | * | 11/2002 | Omata et al. .................... 707/9 |
| 6,687,826 | B1 | * | 2/2004 | Owa .......................... 713/193 |

(Continued)

FOREIGN PATENT DOCUMENTS

EP 0 809 244 11/1997

(Continued)

OTHER PUBLICATIONS

European Office Action for corresponding European Application No. 02 255 701.1-2223, dated Feb. 26, 2007.

(Continued)

*Primary Examiner*—Ayaz Sheikh
*Assistant Examiner*—Arezoo Sherkat
(74) *Attorney, Agent, or Firm*—Greer, Burns & Crain, Ltd.

(57) ABSTRACT

A valid medium issuing system reads a key Ka corresponding to an ID number from a key management book at a request from the script storage system to issue a script medium (MO), decrypts a valid medium certificate in a storage medium delivered from the factory using a key Ka, and generates a script medium (MO). The script medium (MO) is transmitted to the script storage system, and the script storage system records a script document on the script medium (MO). In this process, a decrypting process of a valid medium certificate is performed using the same key Ka, and after confirming the script of the storage medium, the script is recorded. With this configuration, a script document is recorded only for the script.

12 Claims, 13 Drawing Sheets

U.S. PATENT DOCUMENTS

| | | | |
|---|---|---|---|
| 6,751,598 B1 * | 6/2004 | Yagawa et al. | 705/51 |
| 6,782,190 B1 * | 8/2004 | Morito | 386/94 |
| 6,792,113 B1 * | 9/2004 | Ansell et al. | 380/284 |
| 6,918,036 B1 * | 7/2005 | Drews | 713/176 |
| 6,999,587 B1 * | 2/2006 | Asano et al. | 380/202 |
| 2003/0046238 A1 * | 3/2003 | Nonaka et al. | 705/51 |
| 2003/0105718 A1 * | 6/2003 | Hurtado et al. | 705/51 |
| 2003/0135465 A1 * | 7/2003 | Lee et al. | 705/51 |
| 2004/0139018 A1 * | 7/2004 | Anderson et al. | 705/41 |

FOREIGN PATENT DOCUMENTS

| | | |
|---|---|---|
| EP | 0 871 141 | 10/1998 |
| EP | 0 984 346 | 3/2000 |
| EP | 1 035 543 | 9/2000 |
| EP | 1 061 514 | 12/2000 |
| JP | 10-283262 | 10/1998 |
| JP | 10-283263 | 10/1998 |
| JP | 10-283264 | 10/1998 |
| JP | 10-289523 | 10/1998 |
| JP | 11-196084 | 7/1999 |
| JP | 11-238049 | 8/1999 |
| JP | 2000-076138 | 3/2000 |
| JP | 2000-076141 | 3/2000 |
| JP | 2000-260121 | 9/2000 |
| JP | 2001-052431 | 2/2001 |
| JP | 2001-117820 | 4/2001 |
| JP | 2001-282624 | 10/2001 |
| JP | 2001-313636 | 11/2001 |
| JP | 2002-132457 | 5/2002 |
| WO | WO 97/14144 | 4/1997 |
| WO | WO 00/46804 | 8/2000 |

OTHER PUBLICATIONS

European Office Action mailed Nov. 26, 2007 in European Application No. 02 255 701.1, corresponding to subject U.S. Application.

* cited by examiner

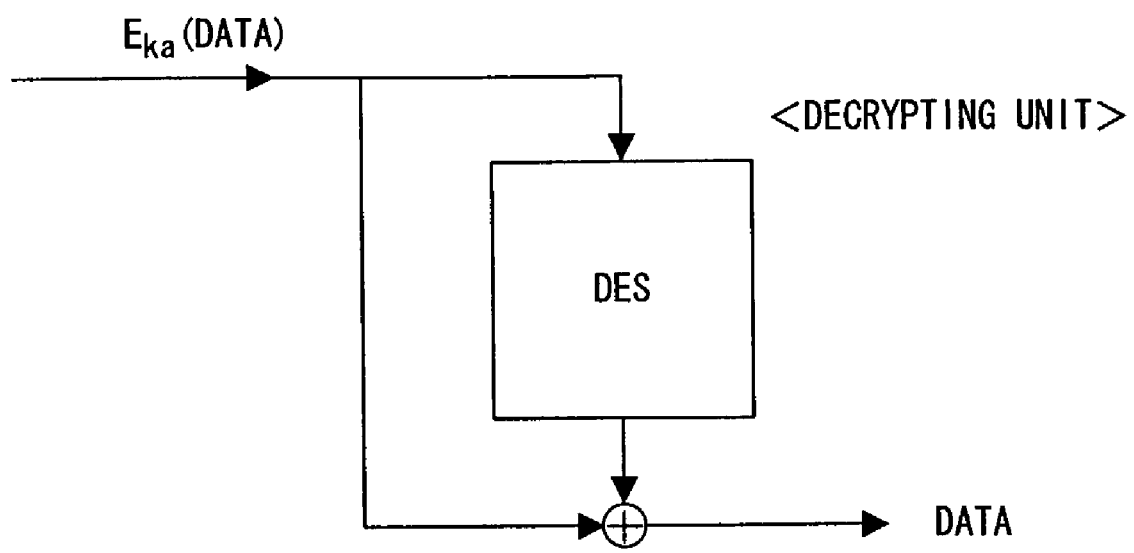
F I G. 7

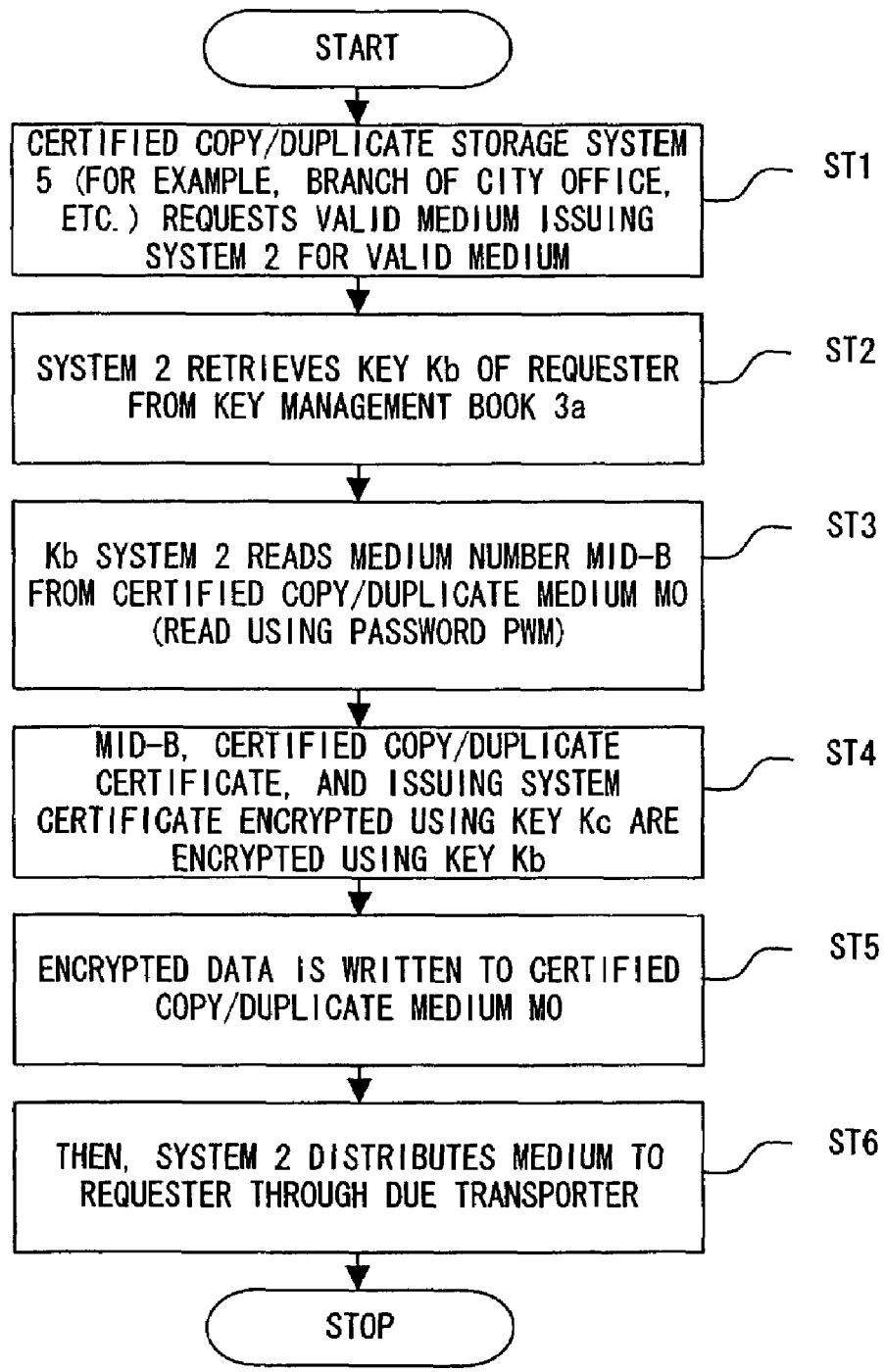
F I G. 8

VALID MEDIUM MANAGEMENT SYSTEM

BACKGROUND OF THE INVENTION

1. Field of the Invention

The present invention relates to a valid medium management system for managing the validity of a storage medium such as a magneto-optical disk, etc. storing a script, a certified copy, or a duplicate of a document.

2. Description of the Prior Art

A number of documents are prepared and stored on storage media such as magneto-optical disks, etc. these days. Papers stored in storage media also cover various fields. For example, they are a development plan and design prepared by a designing division and a sales division of a company, papers relating to family register and others about the residents prepared by a city office, a ward office, etc., papers transmitted and received between companies and organizations, etc.

The security of these documents is very important. For example, it is necessary to store papers such that they cannot be falsified, and the script of a document and a certified copy of the document can be clearly distinguished from each other when they are stored on a storage medium. Especially, when a script, a certified copy, etc. are to be correctly stored, an authority is required to certify a script, a certified copy, etc. To act as an authority, the authority needs a qualification stamp, for example, an electronic key, assigned only to the authority. That is, it is necessary to recognize a target document as a script, recognize a target document as a certified copy, and put an electronic signature to each document using a signature key of the recognizer. Furthermore, to prevent a copy or falsification by a third party, an important document can also be requested to be stored in a medium area in which no copy can be made.

However, in the conventional technology, for example, if a generator of a script unconsciously writes the script to a plurality of storage media, then a plurality of copies of the script, which is to be unique, are made. In addition, if a duplicate document is stored on a storage medium for exclusively storing a script, or if a script document is stored on a storage medium for exclusively storing a duplicate, then there occurs a mix-up, and consistent altering and adding processes cannot be performed on the script document.

On the other hand, there has been a system recently suggested for managing a storage medium by adding a unique number to the medium. That is, with an increasing number of multimedia of these days, a unique number is assigned to each storage medium to correctly protect the copyright of a storage medium. The related information is stored in a non-writable area for a common user.

SUMMARY OF THE INVENTION

The present invention aims at providing a valid medium management system for guaranteeing the originality and uniqueness of a storage medium by a signature put to a non-falsified area of a storage medium for a valid medium, and by certifying the storage medium by a medium issuing system.

That is, the present invention can be realized by providing a valid medium management system including: a storage unit for storing a key corresponding to an ID number of a script storage unit; and a valid medium issuing unit for obtaining the key from the storage unit using the ID number transmitted from the script storage unit, and putting a signature for the valid medium to the non-falsified area of a storage medium using the key. With the configuration, the script storage unit decrypts the signature of the valid medium from the non-falsified area using the same key assigned to the script storage unit as the above mentioned key, and stores a script document on the storage medium.

The storage medium refers to a medium having an area accessible by a common user in a specific storage area such as a magneto-optical disk, etc., stores the medium number unique to the storage medium in the above mentioned area, or records the certification that the storage medium is a valid medium, and puts a signature using the key of the script storage unit. The signature also proves that the valid medium issuing system has legally issued the medium.

With the above mentioned configuration, the script storage unit which has transmitted the storage medium with the signature decrypts the signature using the same key assigned to the unit as the above mentioned key, confirms the stored medium number unique to the storage medium, and records the script document only when the storage medium exclusive for a script is confirmed, thereby storing the script document on the unique script storage medium.

The above mentioned configuration is not limited to the script of a document, but can also be applied to a certified copy or a duplicate. That is, the corresponding certified copy/duplicate storage unit decrypts the signature using the same key assigned to the unit as the above mentioned key on the storage medium with the signature by the valid medium issuing system, and records a certified copy or duplicate document on the storage medium, thereby correctly storing the certified copy or duplicate document on the certified copy or duplicate storage medium.

Furthermore, the storage medium storing a script, certified copy, or duplicate has a signature put to it including history information having time information, and the signed data is recorded. With the configuration, the function of a unique script medium can be improved, and the function of a certified copy or duplicate medium can be improved.

Additionally, the above mentioned object of the present invention can be realized by providing a valid medium issuing device including: a reading unit for reading a key of a script storage unit from a storage device according to an ID number of the script storage unit; and a signature unit for putting a signature of a valid medium to a non-falsified area of a storage medium using the key.

In this case, the valid medium issuing device can transmit a storage medium with a signature to the script storage device, transmit it to the script storage device in an electronic method, and the script storage device provided with the storage medium records a script document.

The above mentioned configuration is not limited to the script of a document, but can also be applied to, for example, a certified copy or a duplicate of a document. The certified copy/duplicate storage device provided with the above mentioned storage medium records the information relating to a certified copy or a duplicate.

BRIEF DESCRIPTION OF THE DRAWINGS

FIG. 7 is a typical view of a decrypting process;

FIG. 8 is a flowchart of generating a certified copy/duplicate medium (MO);

DESCRIPTION OF THE PREFERRED EMBODIMENT

The embodiments of the present invention are described below in detail by referring to the attached drawings.

First Embodiment

Figure 1:
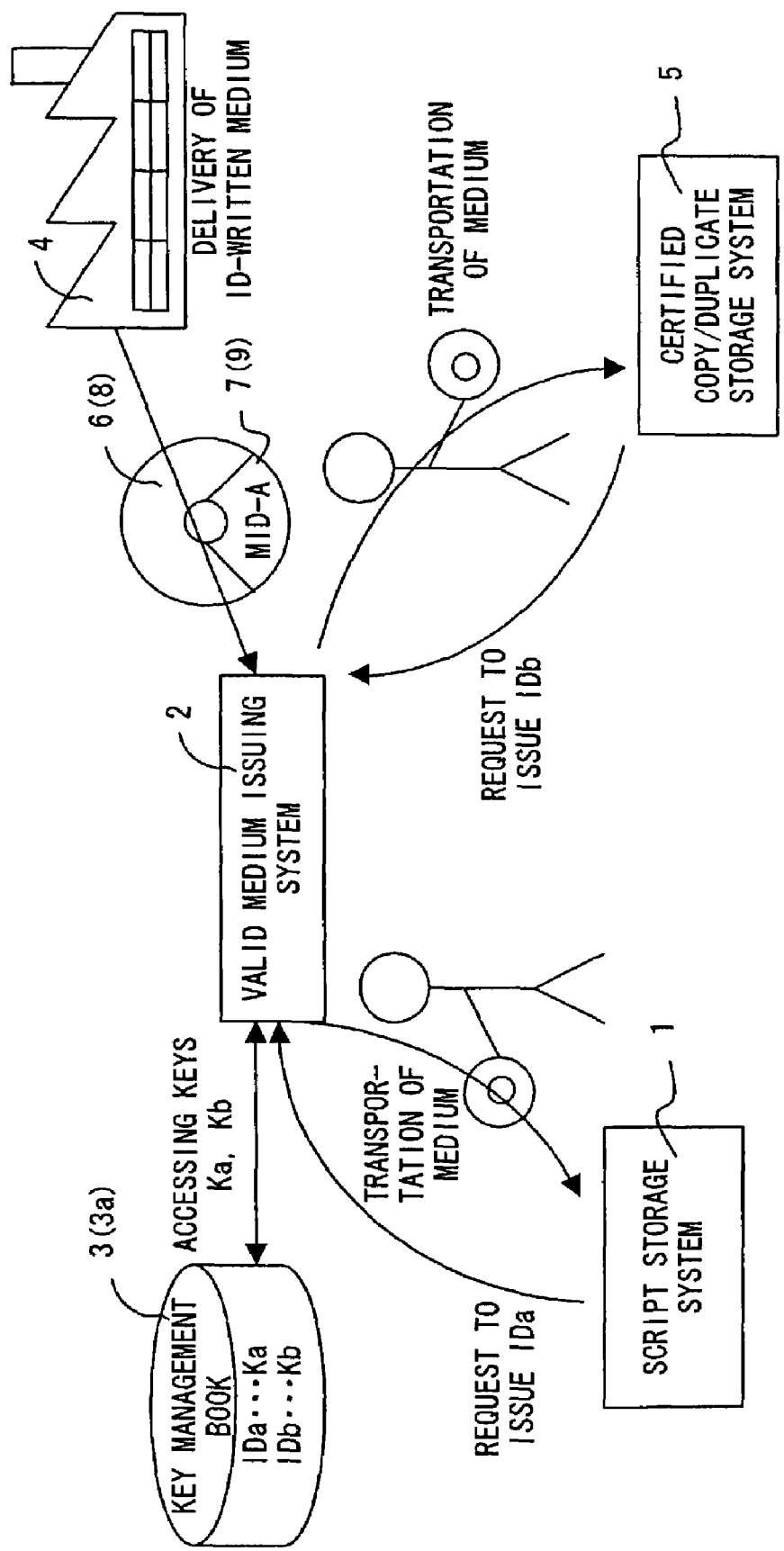
FIG. 1 shows the configuration of the valid medium management system according to the first embodiment of the present invention.

FIG. 1 shows the configuration of the valid medium management system according to an embodiment of the present invention.

In FIG. 1, a script storage system 1 stores the script of a document, and corresponds to, for example, a ward office, a city office, and a sales department of a company. It holds the scripts of resident cards and a family register, or the scripts of development design and plans.

A valid medium issuing system 2 proves that the storage medium is a script, and is connected to the script storage system 1 through a network such as a LAN, Internet, etc. The valid medium issuing system 2 is connected to a storage device 3 in which a key management book 3a is formed, and reads a key corresponding to an ID number from the key management book 3a. The valid medium issuing system 2 is connected to a factory 4 through the network, and receives the delivery from a storage medium assigned a unique number of a storage medium.

The valid medium issuing system 2 performs a process of issuing a storage medium using the key obtained from the key management book 3a, puts a signature of a valid medium on the storage medium delivered from the factory 4, and transports it to the script storage system 1. The script storage system 1 performs a decrypting process on the transported storage medium, and records the script of the document. The decrypting and recording processes are described later.

A certified copy/duplicate storage system 5 stores a certified copy or a duplicate of a document, and is connected to the valid medium issuing system 2 through the network. For example, it corresponds to an agency or a branch of a governmental office, or a sales office or a branch of a company. The certified copy/duplicate storage system 5 also stores a certified copy or a duplicate of a document on a storage medium certified by the valid medium issuing system 2.

A practical processing method is described below by referring to a flowchart.

Figure 2:
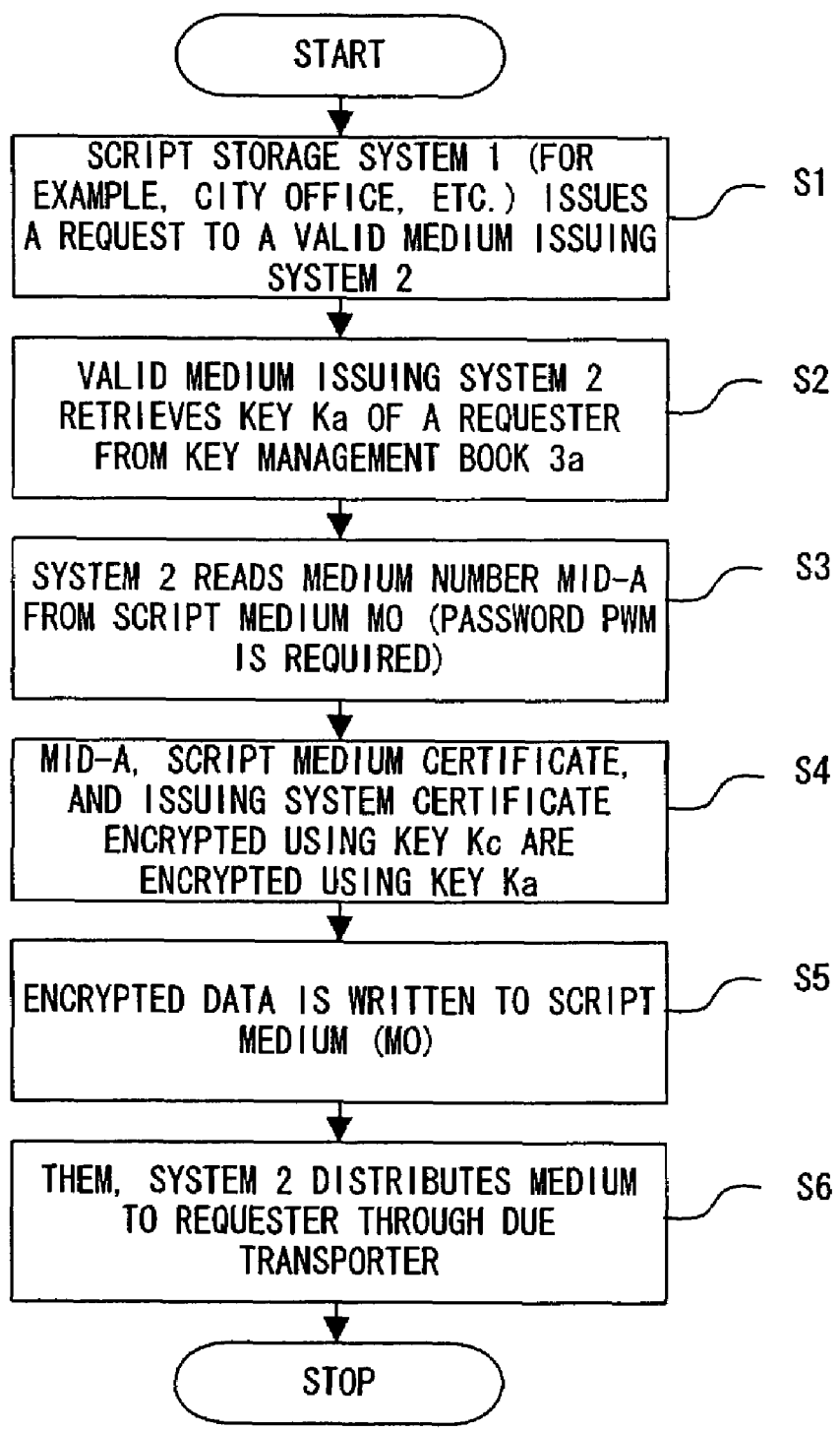
FIG. 2 is a flowchart of the operation of the process performed by the valid medium management system according to the first embodiment of the present invention.

FIG. 2 is a flowchart of the process according to the first embodiment of the present invention. First, the script storage system 1 requests the valid medium issuing system 2 to issue a storage medium for storing the script of a document (step (hereinafter represented by S) 1). At this time, the script storage system 1 simultaneously transmits also the ID code (IDa) certifying the script storage system 1 to the valid medium issuing system 2.

Upon receipt of a request to issue a storage medium, the valid medium issuing system 2 accesses the key management book 3a according to the ID code (IDa) received together, and reads a corresponding key Ka from the key management book 3a (S2). A key corresponding to an ID code is entered in advance in the key management book 3a as shown in FIG. 1, and the key management book 3a retrieves the key Ka according to the ID code (IDa), reads the key Ka, and passes it to the valid medium issuing system 2.

The valid medium issuing system 2 generates a storage medium with a certificate of the valid medium issuing system 2 using the key Ka retrieved from the key management book 3a. In this case, the valid medium issuing system 2 receives the delivery of an ID-written storage medium from the factory 4. The storage medium delivered from the factory 4 is, for example, a magneto-optical disk (MO disk), and a medium number is recorded in a storage medium. According to the first embodiment, 'MID-A' is recorded as the medium number.

Figure 3:
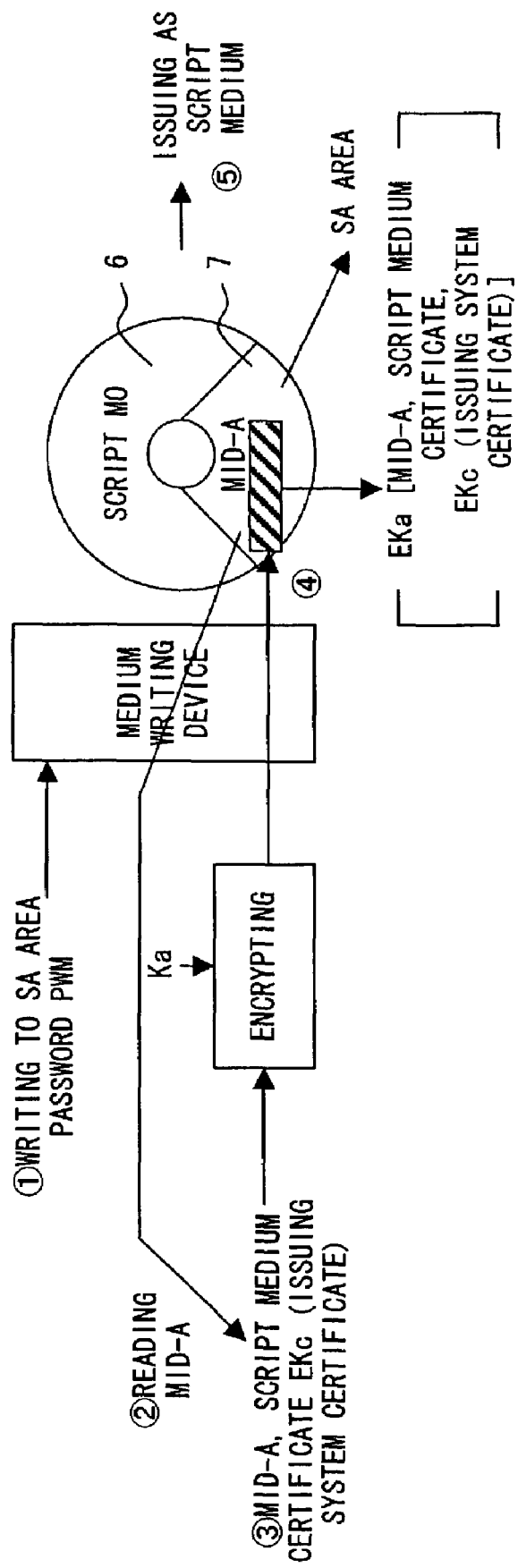
FIG. 3 shows the process of writing data to a script medium (MO)

The valid medium issuing system 2 generates a storage medium with a valid medium certificate using the storage medium 'MID-A' delivered from the factory 4. FIG. 3 is a typical view of the process.

First, the valid medium issuing system 2 accesses the SA area (secure area) of the storage medium delivered from the factory 4 using a password (PWM), and reads the information about the medium number (①and ②in S3 shown in FIG. 3). The medium number of the above mentioned medium is 'MID-A', and the medium number of 'MID-A' is read in the above mentioned process. The SA area cannot be accessed without the password (PWM), and the SA area is a non-falsified area.

Then, the 'EKc (issuing system certificate)' obtained by encrypting the 'script medium certificate' and the 'issuing system certificate' together with the information about the medium number of 'MID-A' using the key Kc of the valid medium issuing system 2 is encrypted using the key Ka of the script storage system 1 (③in S4 shown in FIG. 3). The 'script medium certificate' is to certify that the medium is used to store a script document. For example, it describes "the present medium stores a script, and is assigned the number of 'MID-A1'".

Figure 4:
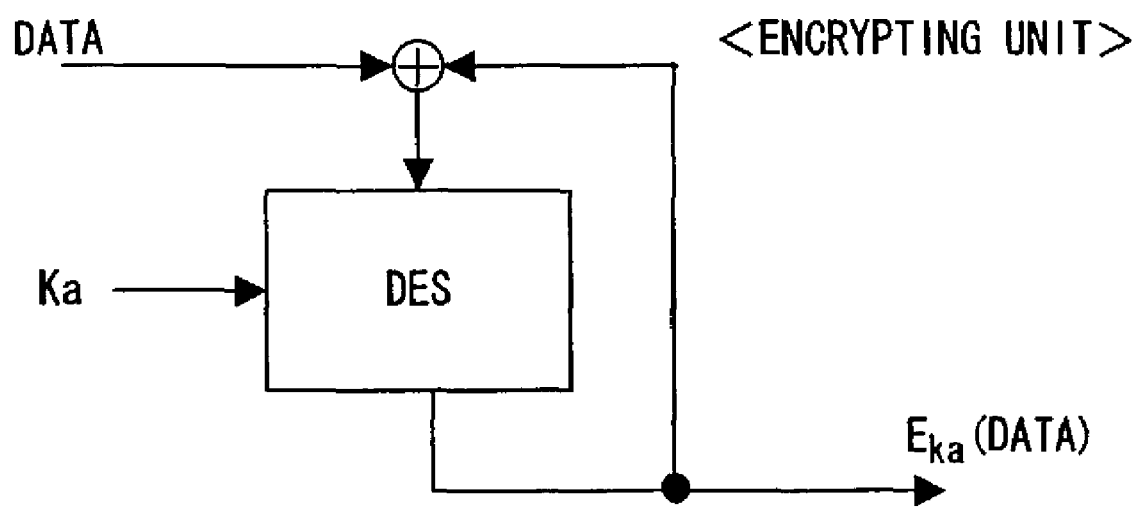
FIG. 4 shows an encrypting process.

In addition, the above mentioned encrypting process transmits data (DATA) to the encrypting unit through an arithmetic unit as shown in FIG. 4, encrypts the data (DATA) using the key Ka according to the algorithm of the DES (data encryption standard), and obtains the encrypted text EKa (DATA). In the present embodiment, the data (DATA) includes a medium number of 'MID-A', a 'script medium certificate', and an 'EKc (issuing system certificate)'. The encrypted output EKa (DATA) is expressed as follows. Still more, Eka (DATA) mean that the data is encrypted by the key Ka.

EKa (DATA)=EKa ('MID-A', 'script medium certificate', 'EKc (issuing system certificate)')

Additionally, the 'EKc (issuing system certificate)' is obtained by encrypting the 'issuing system certificate' using the key Kc of the valid medium issuing system 2, and the encrypting method is the same as the above mentioned method.

Then, the encrypted EKa (DATA) is written to the script medium (④ in S5 shown in FIG. 3). In this process, the encrypted EKa (DATA) is written to the SA area 7 of a script medium (MO) 6. The encrypted EKa (DATA) is also referred to as a script certificate seal.

The valid medium issuing system 2 transfers the script medium (MO) 6 to whose SA area 7 the encrypted 'EKa (DATA)' is written (⑤ in S6 shown in FIG. 3). Thus, the script of a document is recorded by the script storage system 1 on the script medium (MO) 6 transmitted from the valid medium issuing system 2.

Figure 5:
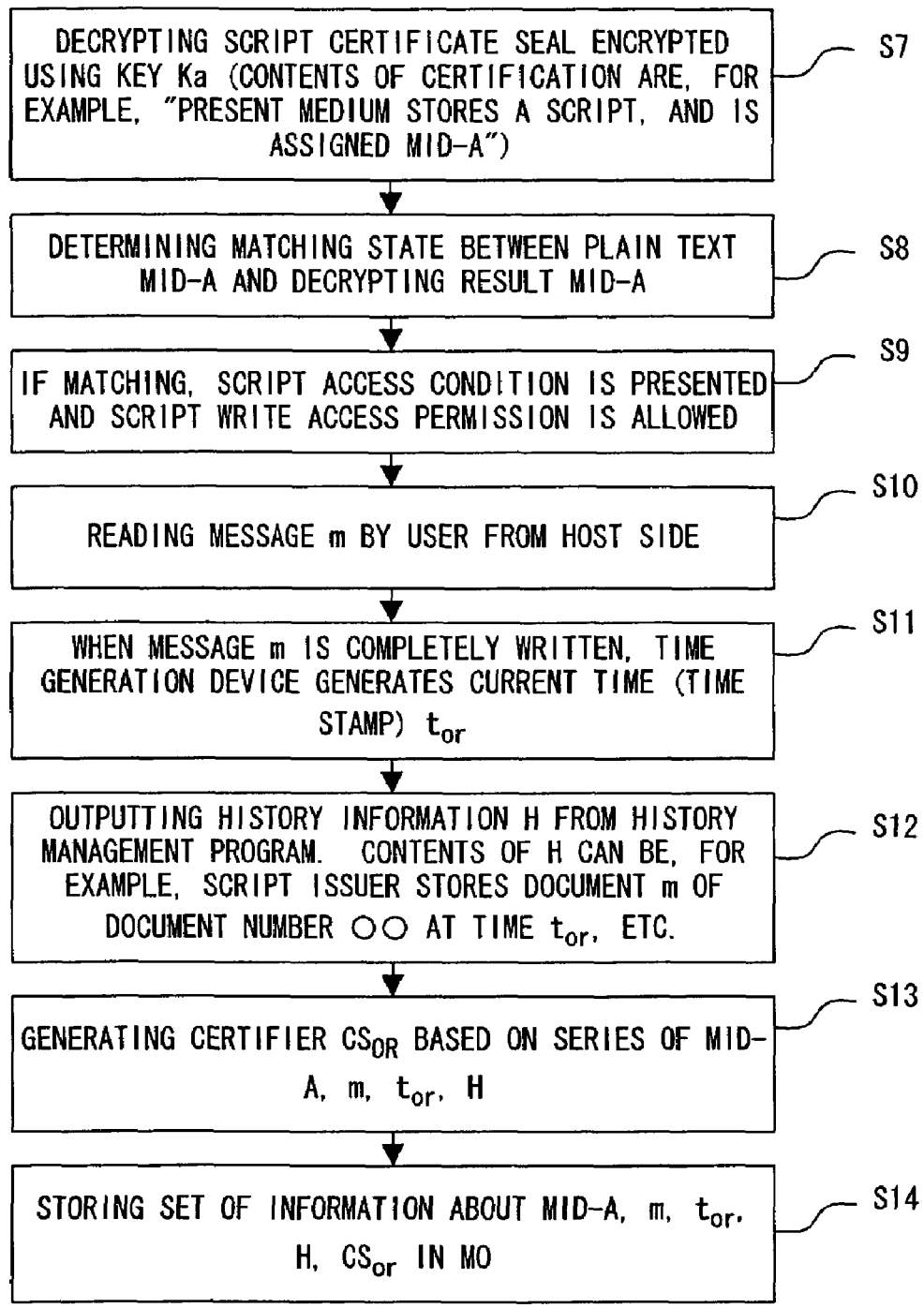
FIG. 5 is a flowchart of a decrypting process.

Described below is the process of writing the script document performed by the script storage system 1 to the script medium (MO) 6. FIG. 5 is a flowchart of the process, and FIG. 6 is a typical view of the script writing process.

Figure 6:
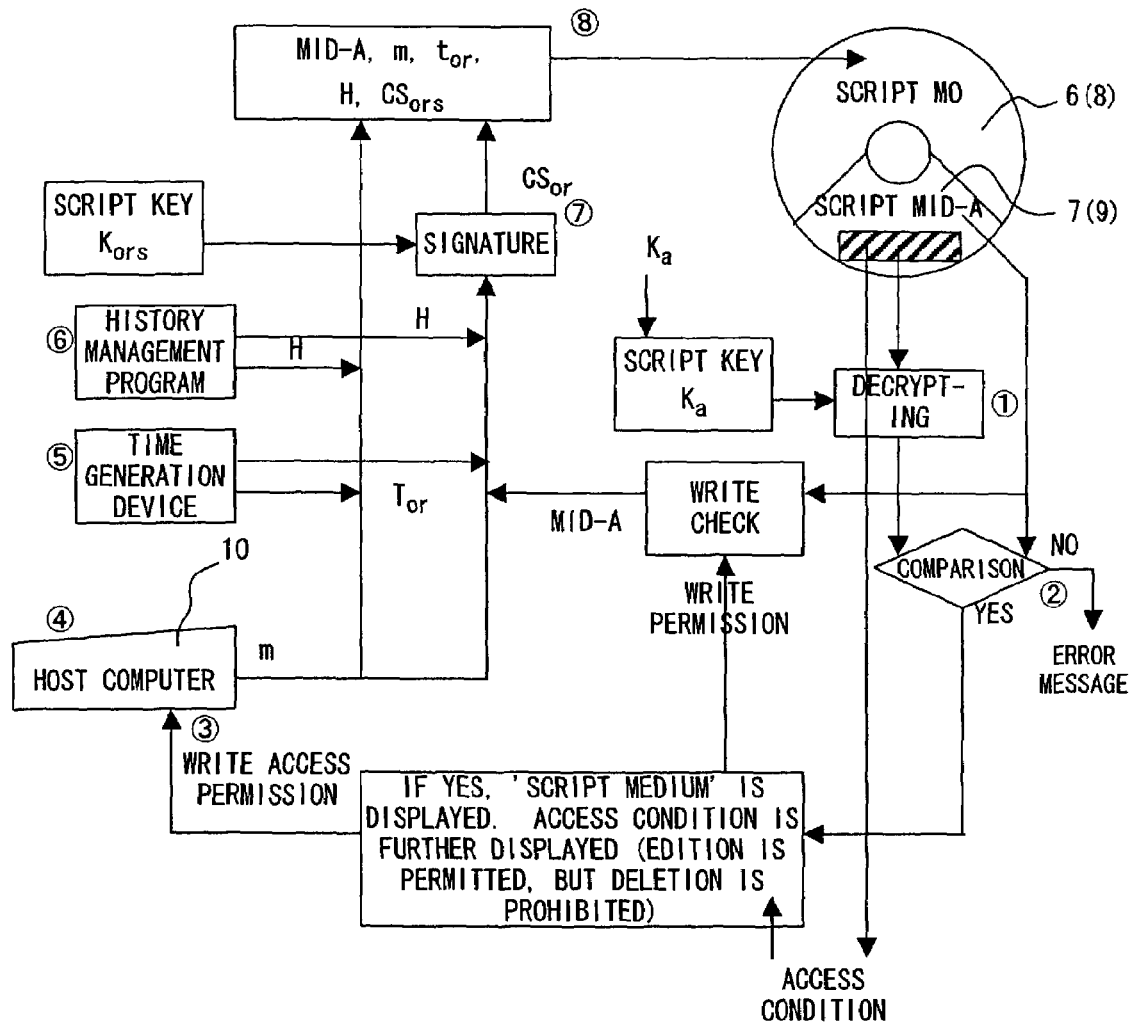
FIG. 6 is a typical view of a decrypting process.

First, the script storage system 1 inserts the script medium (MO) 6 into the driver of a host computer 10, accesses the SA area 7 of the script medium (MO) 6, and decrypts the above mentioned script certificate seal using the key Ka of the script storage system 1 (① in S7 shown in FIG. 6). FIG. 7 is a typical view of the decrypting process. The decrypting process is the above mentioned encrypting process performed in reverse order. The EKa (DATA) is read from the SA area 71 and decrypted according to the DES algorithm.

Then, the data obtained as a result of the above mentioned decrypting process, that is, the information encrypted using the key Ka, 'MID-A', 'script medium certificate', and 'EKc (issuing system certificate)' are compared with the plain text to determine whether or not they match (② in S8 shown in FIG. 6). Practically, for example, the plain text 'MID-A' is compared with the 'MID-A' obtained as a result of the decrypting process.

If the data match each other, the access condition of the script is presented, and write access to the script is permitted (③ in S9 shown in FIG. 6). Then, the contents of the descriptions of the 'script medium certificate', that is, the description above, "the present medium stores a script, and is assigned the number of 'MID-A'", is displayed on the display unit of the host computer 10.

The access condition of the script refers to the condition of permitting the edition of data, but prohibiting the deletion of data. The access condition of the script is also displayed on the display unit of the host computer 10.

If the above mentioned determination is NO, then an error message is displayed on the display unit, and write access is not permitted on the script medium (MO) 6. With the configuration, the script storage system 1 necessarily writes a script document to the script medium (MO) 6 certified as a valid medium by the valid medium issuing system 2.

If the script medium (MO) 6 is certified, then write permission is obtained and the script storage system 1 writes the message m (④ in S10 shown in FIG. 6). The message m is a script document to be recorded on the script medium (MO) 6.

Next, the time data (tor) is read from the time generation device, and written to the script medium (MO) 6, thereby generating what is called a time stamp (⑤ in S11 shown in FIG. 6). The time stamp refers to a process of recording the time at which the script document is written.

Then, a history management program is driven to write history information H (⑥ in S12 shown in FIG. 6). For example, the contents of the history information H can be, "the document m of the document number has been stored by the script storage system 1 at time (tor)", etc.

Next, a signature is put based on a series of write information 'MID-A', 'message m', 'time data (tor)', and 'history information H' (S13), and a certifier (C Sor) is generated (⑦ in S13 shown in FIG. 6). In this case, the process is performed using another key Kors of the script storage system 1.

Finally, a set of information on a hard disk including 'MID-A', 'message m', 'time data (tor)', 'history information H', and 'certifier (C Sor)' is stored in the script medium (MO) 6 (⑧ in S14 shown in FIG. 6). In this process, the script document is stored in the script medium (MO) 6.

As described above, when the script storage system 1 generates a script document, a storage medium is set in the driver in the decrypting process. Therefore, the script certificate seal is confirmed, and an error message is displayed if, for example, no script certificate seal is detected, different medium numbers are detected, etc. As a result, the script document cannot be mistakenly recorded on a storage medium other than the script medium (MO) 6.

Furthermore, the 'script medium certificate' is displayed as a description on the display unit so that it is confirmed that the set storage medium is a medium for storing a script (script medium (MO) 6).

In addition, the 'issuing system certificate' of the valid medium issuing system 2 which is a system of issuing a valid medium certificate is also added. Therefore, a certificate of the certification system can also be obtained in a decrypting process performed as necessary.

Additionally, the certification of a valid medium according to the present embodiment is recorded on the SA area 7 of a storage medium, an electronic signature is put to the non-falsified area for a third party, and the validity of the script medium (MO) 6 is guaranteed.

Second Embodiment

Described below is the second embodiment of the present invention.

In the present embodiment, the valid medium management system for a certified copy or a duplicate document is described. This process is performed by the above mentioned valid medium issuing system 2 and the certified copy/duplicate storage system 5. FIG. 8 is a flowchart of the process according to the present embodiment, and the view of the system shown in FIG. 1 is also used in explaining the present embodiment.

First, the certified copy/duplicate storage system 5 requests the valid medium issuing system 2 to issue a storage medium for storing a certified copy or a duplicate (step (hereinafter represented by ST) 1). Simultaneously, the ID code (IDb) for certification of the certified copy/duplicate storage system 5 is also transmitted.

Upon receipt of the request to issue a storage medium, the valid medium issuing system 2 accesses the key management book 3a using the ID code (IDb), and retrieves a corresponding key Kb from the key management book 3a (ST2).

Then, the valid medium issuing system 2 generates a storage medium with a certificate of the valid medium issuing system 2. In this process, as described above, the SA area of the storage medium delivered from the factory 4 and having a written ID is accessed using a password (PWM), and the information about the medium number of the storage medium (for example, 'MID-B') is read (ST3).

Next, the 'EKc (issuing system certificate)' obtained by encrypting the 'certified copy/duplicate medium certificate' and the 'issuing system certificate' using the key Kc of the valid medium issuing system 2 together with the information about the medium number of 'MID-B' is encrypted using the of the certified copy/duplicate storage system 5 (ST 4). In this case, the 'certified copy/duplicate medium certificate' certifies that the medium is to store the certified copy or a duplicate of the script, and describes, for example, "the medium stores a certified copy or a duplicate, and is assigned the number of 'MID-B'".

Furthermore, the above mentioned encrypting process generates the following EKb (DATA) as in generating a script.

EKb (DATA)=EKb ('MID-B', 'certified copy/duplicate medium certificate', 'EKc (issuing system certificate)')

Then, the encrypted EKb (DATA) is written to an SA area 9 of the storage medium (certified copy/duplicate medium (MO) 8) 'MID-B', and is defined as a certified copy/duplicate certificate seal (ST5). The certified copy/duplicate medium (MO) 8 to which the certified copy/duplicate certificate seal is written is distributed to the certified copy/duplicate storage system 5 (ST 6), and thereafter used as a medium for storing a certified copy or a duplicate instead of the script.

Figure 9:
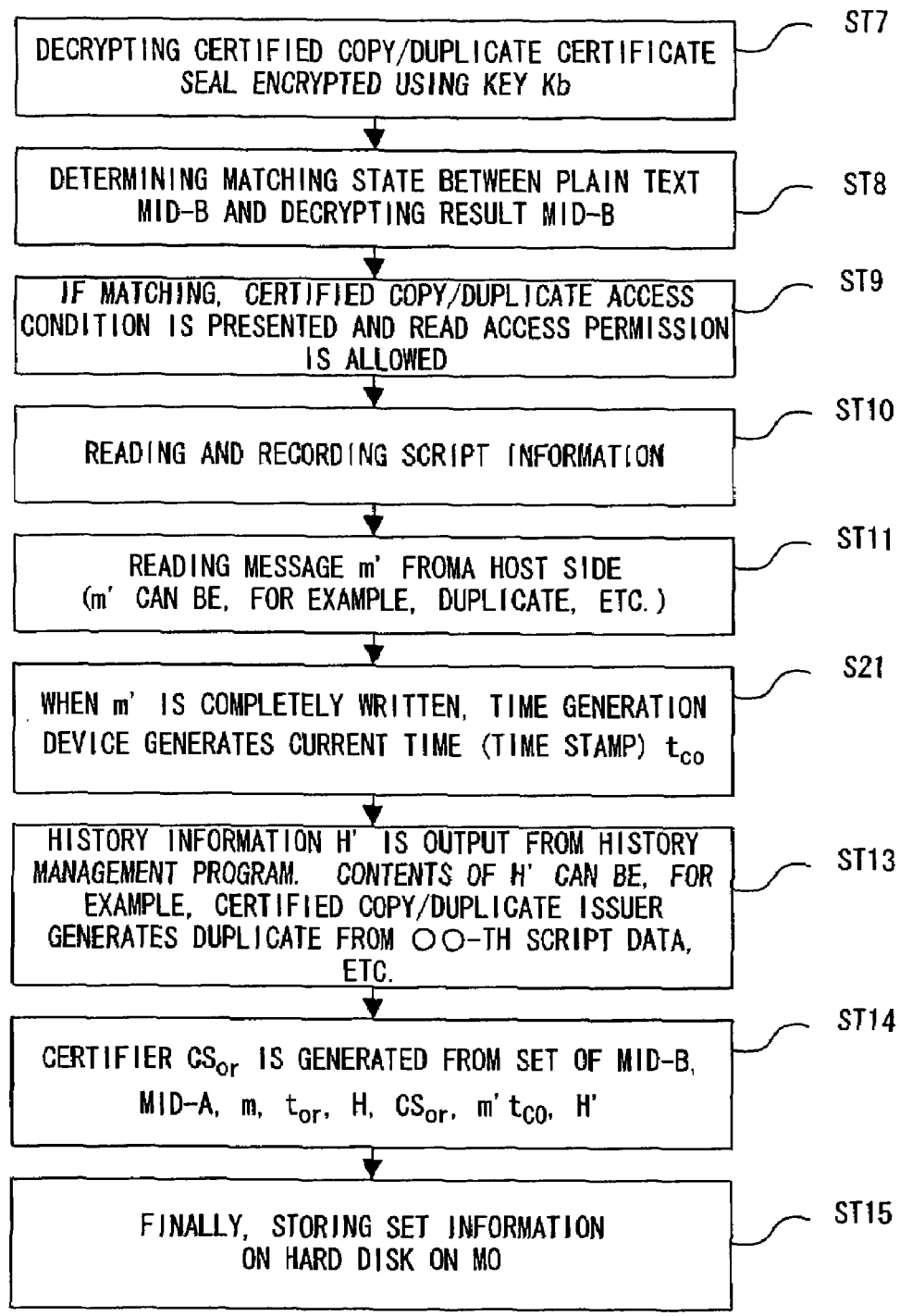
FIG. 9 is a flowchart of the operation of the process performed by the valid medium management system according to the second embodiment of the present invention.

When certified copy or duplicate data is stored in the certified copy/duplicate medium (MO) 8, the following process is performed. FIG. 9 is a flowchart of the process, and FIG. 10 is a typical view of the process.

Figure 10:
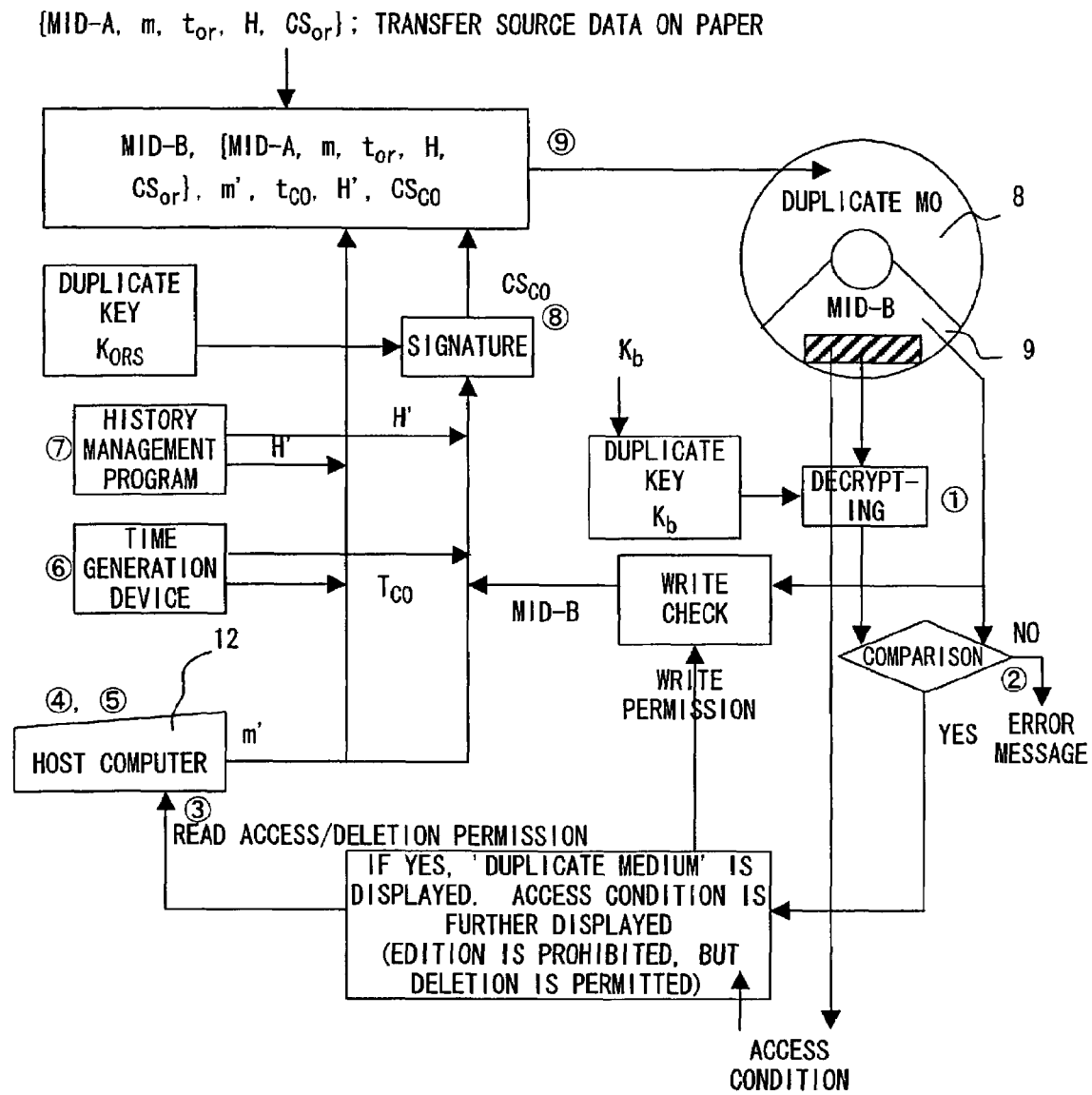
FIG. 10 is a typical view of generating a certified copy/duplicate medium (MO)

First, the certified copy/duplicate certificate seal encrypted using the key Kb is decrypted (①in ST 7 shown in FIG. 10). In this case, using the key Kb of the certified copy/duplicate storage system 5, the EKba (DATA) is read from the SA area 9 of the certified copy/duplicate medium (MO) 8, and the encrypted data is decrypted according to the DES algorithm. Then, the data obtained as a result of the decrypting process, that is, the information 'MID-B' decrypted using the key Kb is compared with the plain text 'MID-B' to determine whether or not they match each other (②in ST 8 shown in FIG. 10).

If the data match each other, then the access condition of the certified copy or the duplicate is presented on the display unit of a host computer 12, and write access is permitted (③ in ST 9 shown in FIG. 10). In this case, for example, the access condition can prohibit the edition of data, but can permit the deletion of data, etc. The information that the storage medium (certified copy/duplicate medium (MO) 8) set in the display unit is used to generate a certified copy or a duplicate. If the determination outputs a non-matching result, an error message is displayed on the display unit.

If the certified copy/duplicate medium (MO) 8 is determined to be a valid medium, then read access is permitted, and necessary information is stored in the certified copy/duplicate storage system 5.

First, the script information is read and recorded (④in ST 10 shown in FIG. 10). The script information includes the 'MID-A', 'message m', 'time data (tor)', 'history information H', and 'certifier (C Sor)' stored in the script storage system 1, received from the script storage system 1 through, for example, a network. They also can be received through media.

Then, a message m' is written (⑤in ST 11 shown in FIG. 10). For example, a description such as "this is a duplicate" as a message m'. Then, the time data (tco) is read from the time generation device, written to the certified copy/duplicate medium (MO) 8, and what is called a time stamp is generated (⑥in ST 12 shown in FIG. 10).

Next, the history management program is driven, and history information H' is written (⑦in ST 13 shown in FIG. 19). In this case, as the contents of the above mentioned 'history information H', for example, the description such as "the certified copy/duplicate storage system 5 generates a duplicate from the oo-th script data at 'time (tco)'"

Then, a signature is put according to a series of information including 'MID-B', 'MID-A', 'message m', 'time data (tor)', 'history information H', certifier (C Sor), 'message m' 'time data (tco)', and 'history information H" (ST 14) to generate a certifier (C Sco) (⑧in ST 14 shown in 10). Furthermore, a set of information on a hard disk is stored on the storage medium 'MID-B' (⑨in ST 15 shown in FIG. 10).

In the above mentioned process, a certified copy or a duplicate of a document is generated on the certified copy/duplicate medium (MO) 8 certified by the valid medium issuing system 2, and is stored in the certified copy/duplicate storage system 5.

Therefore, in this case, when the certified copy/duplicate storage system 5 records the information about a certified copy or a duplicate on the certified copy/duplicate medium (MO) 8, the storage medium is first set in the driver, and then the decrypting process is performed. Therefore, the above mentioned certified copy/duplicate certificate seal is confirmed, and an error message is displayed if no certified copy/duplicate certificate seal is detected or different medium numbers are detected, thereby storing a certified copy or a duplicate document on a valid storage medium without fail.

Furthermore, the 'issuing system certificate' of the valid medium issuing system 2, which is an issuing system of a valid medium certificate, is also added to confirm a certification system as necessary.

In addition, the certification of a valid medium according to the present embodiment is recorded in the SA area 9, that is, in a non-falsified area for a third party, thereby guaranteeing the validity of the certified copy/duplicate medium (MO) 8.

Third Embodiment

Described below is the third embodiment of the present invention.

In the first embodiment of the present invention, the valid medium issuing system 2 put the signature for a valid medium to the storage medium delivered from the factory 4, and transmits the script medium (MO) 6 to the script storage system 1, thereby recording the script. However, according to the present embodiment, the process is performed when the script storage system 1 has an ID-written storage medium.

The practical explanation is given below.

Figure 11:
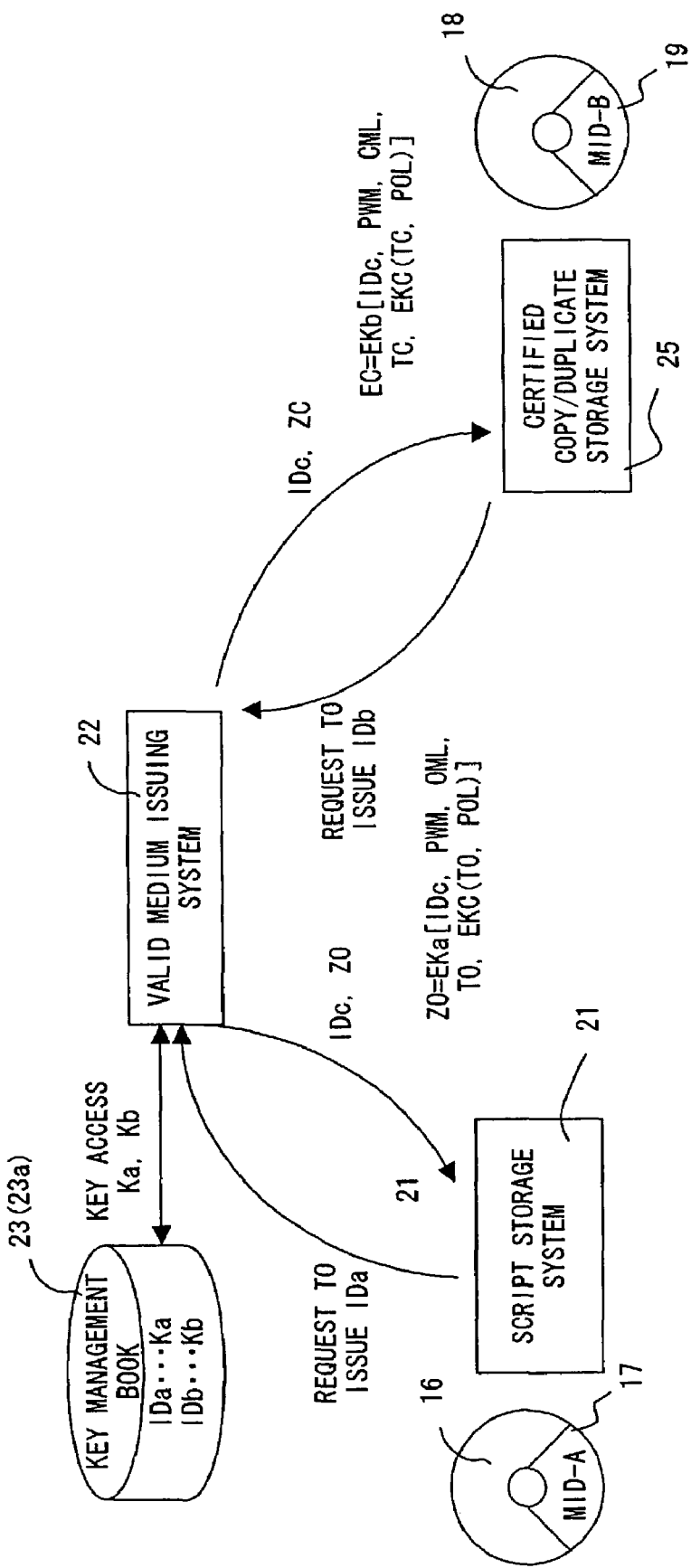
FIG. 11 shows the configuration of the valid medium management system according to the third embodiment of the present invention.

FIG. 11 shows the valid medium management system according to the third embodiment. According to the present embodiment, a script storage system 21, a valid medium issuing system 22, and a certified copy/duplicate storage system 25 are connected through a network such as a LAN, Internet, etc. The script storage system 21 can be a section of a ward office, a city office, and a company, and stores the script of a document. The valid medium issuing system 22 certifies the script medium storing a document. The certified copy/duplicate storage system 25 stores a certified copy or a duplicate document, and corresponds to a branch of a governmental office, a sales office, a branch, etc. of a corporation, etc.

Figure 12:
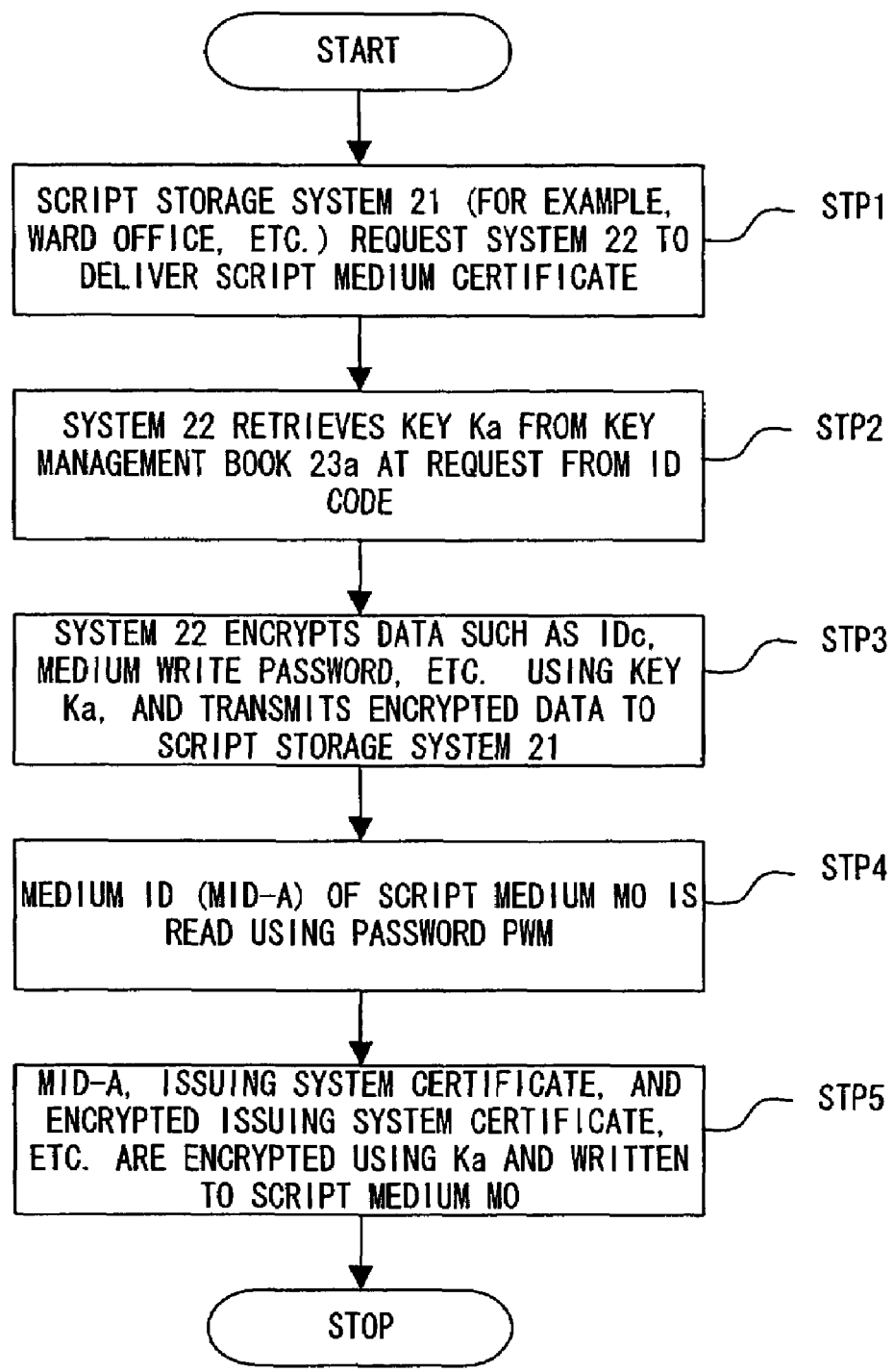
FIG. 12 is a flowchart of the operation of the process performed by the valid medium management system according to the third embodiment of the present invention.

FIG. 12 is a flowchart of the process of the present embodiment.

First, the script storage system 21 requests the valid medium issuing system 22 to deliver a valid medium certificate (step (hereinafter represented by STP) 1). In this case, the script storage system 21 transmits an ID code (IDa) to the valid medium issuing system 22.

Upon receipt of a request to deliver a script medium certificate, the valid medium issuing system 22 accesses a storage device 23 (key management book 23a), and reads the key Ka corresponding to the ID code (IDa) from the key management book 23a (STP 2).

In the present embodiment, The script storage system 21 holds an ID-written storage medium, and the script storage system 21 writes the script medium certificate to the storage medium. Therefore, the valid medium issuing system 22 generates data for certification using the key Ka, and transmits it to the script storage system 21. As a result, the valid medium issuing system 22 generates the transmission data ZO signed using the key Ka. The transmission data ZO includes the information about 'IDc', 'PWM', 'OML', 'TO', 'TKc (TO, POL)'.

The 'IDc' refers to the ID number of the valid medium issuing system 22, and the 'PWM' refers to a password for access to an SA area 17 of a script medium (MO) 16. The 'OML' is a certificate of a valid medium. The 'POL' is a certificate of the valid medium issuing system 22. The 'EKc (TO, POL)' is data encrypted using the key Kc together with the time information 'TO'. Each piece of the data is encrypted using the key Ka of the script storage system 21, and is transmitted as the transmission data ZO to the script storage system 21 (STP 3).

The script storage system 21 generates a medium with a certificate using the transmission data ZO transmitted from the valid medium issuing system 22.

Figure 13:
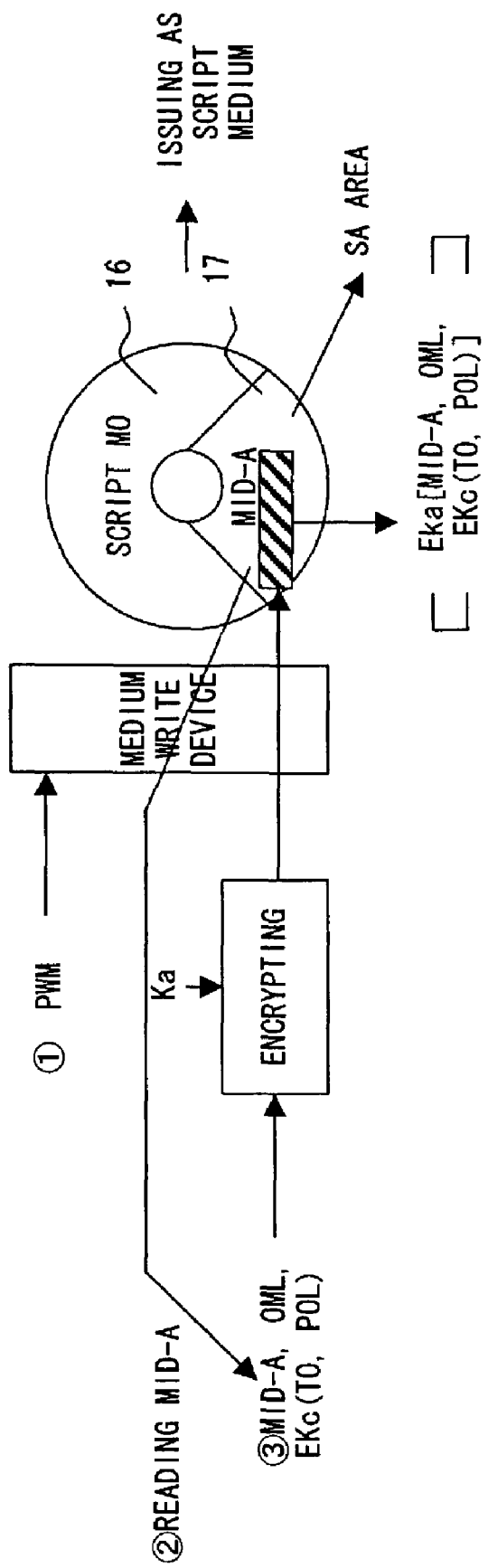
FIG. 13 shows an encrypting process.

FIG. 13 is a typical view of the process of generating a medium with a certificate. The script storage system 21 accesses the SA area 17 of the script medium (MO) 16 using the password 'PWM', and reads the information about the medium name of 'MID-A' (①and ②in STP 4 shown in FIG. 13).

Then, the read 'MID-A' and the information about the transmission data ZO transmitted from the valid medium issuing system 22, that is, the valid medium certificate 'OML', and the issuing system certificate 'EKc (TO, POL)' encrypted by the valid medium issuing system 22 are encrypted using the key Ka, and the result is written to the SA area 17 of the script medium (MO) 16 (③ in STP 5 shown in FIG. 13).

In the above mentioned process, EKa (DATA)=EKa ('MID-A', 'script medium certificate (OML)', 'EKc (time TO), (issuing system certificate)' is stored in the SA area 17 of the script medium (MO) 16 as an issue certification seal.

When a script document is recorded in the script medium (MO) 16 described above, the process shown in FIG. 5 is performed. Also in this case, the script storage system 1 inserts the script medium (MO) 16 into the driver of the host computer 10, and decrypts the script certificate seal from the script medium (MO) 16 using the key Ka.

Then, the medium number 'MID-A' obtained as a result of the above mentioned decrypting process is compared with the plain text 'MID-A'. If the data match each other, the access condition of the script medium (MO) 16 is presented, and the write access to the script medium (MO) 16 is permitted, and the message m is written as in the case above, and the time data (tor), and the history information H are written. In addition, as in the case above, a certifier (C Sor) is generated, and a set of information is finally stored in the script medium (MO) 16.

With the configuration above, although an ID-written medium is prepared in the script storage system 21, a signature of the valid medium issuing system 22 can be stored in the script medium (MO) 16 as in the case above, thereby storing the script data in the script medium (MO) 16 without fail.

Fourth Embodiment

Described below is the fourth embodiment of the present invention.

The process of generating a certified copy or a duplicate certified by the valid medium issuing system according to the present embodiment is described below. In this case, an ID-written storage medium is not delivered from the factory 4, but is held by the certified copy/duplicate storage system 25 according to the system shown in FIG. 11. The practical explanation is given below.

First, the certified copy/duplicate storage system 25 requests the valid medium issuing system 22 to issue a valid medium certificate for use in generating a certified copy or a duplicate, and simultaneously transmits an ID code (IDb). Upon receipt of the request to issue a valid medium certificate, the valid medium issuing system 22 accesses the key management book 23*a*, and reads a corresponding key Kb from the key management book 23*a*. As described above, the valid medium issuing system 22 generates transmission data ZC. The transmission data ZC includes 'IDc', 'PWM', 'CML', 'TC', 'EKc (TC, POL)'.

The 'IDc' refers to the ID number of the valid medium issuing system 22, and the 'PWM' refers to a password for access to an SA area 19 of a certified copy/script medium (MO) 18. The 'CML' is a certificate of a valid medium. The 'POL' is a certificate of the valid medium issuing system 22. The 'EKc (TO, POL)' is data encrypted using the key Kc together with the time information 'TC'. The transmission data ZC is transmitted to the certified copy/duplicate storage system 25.

The certified copy/duplicate storage system 25 generates the certified copy/script medium (MO) 18 using the key Kb as described above. Then, the encrypted certified copy/duplicate certificate seal is decrypted, the decrypted information 'MID-B' is read from the SA area 19 of the certified copy/script medium (MO) 18 and compared with the plain text 'MID-B', and it is determined whether or not they match each other. If the data match each other, then the access condition of a certified copy or a duplicate is displayed on the display unit of the host computer 12, and write access to the certified copy or the duplicate is permitted. If they do not match, then an error message is displayed on the display unit.

Then, if it is determined that the certified copy/script medium (MO) 18 is a valid medium, the certified copy/duplicate storage system 25 records the information about a certified copy or a duplicate. That is, for example, script information ('MID-A', 'message m', 'time data (tor)', 'history information H', and certifier (C Sor)) is received through a network, the script information is recorded, the 'message m' is written, the time data (tor) is read, and the history information H is written. Furthermore, the certifier (C Sor) is generated, and a set of information on the hard disk is finally recorded on the certified copy/script medium (MO) 18.

As a result of the above mentioned process, a certified copy or a duplicate data can be stored on the certified copy/script medium (MO) 18 although the certified copy/duplicate storage system 25 has prepared an ID-written medium.

As described above, when a script document is recorded on a script medium according to the present invention, a script certificate seal signed by the valid medium issuing system is decrypted, and the medium number of a script medium is confirmed, thereby recording a script document on the script medium without fail.

Furthermore, since an issuing system certificate of a valid medium issuing system, which is an issuing system of a script certificate seal, is added, the originality of a script medium can be guaranteed.

In addition, the certification of a valid medium is recorded in a non-falsified area of a storage medium, and the management of a valid medium can be further guaranteed.

Additionally, a script storage system and a certified copy/duplicate storage medium can also give a signature of a valid medium issuing system, thereby possibly generating a script medium and a certified copy/duplicate medium by either of the systems.

What is claimed is:

1. A valid medium management system, comprising:
   an original data storage system storing an original data;
   a storage unit storing a key corresponding to an ID number specifying the original data storage system; and
   a valid medium issuing system obtaining the key corresponding to the ID number specifying said original data storage system from said storage unit based on an assignment from said original data storage system, and putting a unique medium number assigned to a valid medium and an encrypted signature of the valid medium in a non-falsified area of a storage medium using the key corresponding to the ID number specifying said original data storage system;

wherein said original data storage system decrypts the signature of the valid medium from the non-falsified area, and records the original data that includes time data and history data on the storage medium.

2. A valid medium management system, comprising:

a certified copy/duplicate storage system storing a certified copy or a duplicate of an original data;

a storage unit storing a key corresponding to an ID number specifying the certified copy/duplicate storage system; and a valid medium issuing system obtaining the key corresponding to the ID number specifying said certified copy/duplicate storage system from said storage unit based on an assignment from said certified copy/duplicate storage system, and putting a unique medium number assigned to a valid medium and an encrypted signature of the valid medium in a non-falsified area of a storage medium using the key corresponding to the ID number specifying said certified copy/duplicate storage system;

wherein said certified copy/duplicate issuing system decrypts the signature of the valid medium from the non-falsified area using the key corresponding to the ID number specifying said certified copy/duplicate storage system, and stores a certified copy or a duplicate of the original data that includes time data and history data on the storage medium.

3. The system according to claim 1, wherein said valid medium issuing system receives the storage medium which is assigned the unique medium number and has the non-falsified area, from a medium issuing facility.

4. The system according to claim 2, wherein said valid medium issuing system receives the storage medium which is assigned the unique medium number and has a non-falsified area, from a medium issuing facility.

5. The system according to claim 1, wherein the signature of the valid medium recorded in the non-falsified area of the storage medium comprises the unique medium number and a certificate of the valid medium issuing system.

6. The system according to claim 2, wherein the signature of the valid medium recorded in the non-falsified area of the storage medium comprises the unique medium number and a certificate of the valid medium issuing system.

7. A valid medium management system, comprising:

an original data storage unit storing an original data of a document;

a storage unit storing a key corresponding to an ID number specifying said original data storage unit; and a valid medium issuing unit obtaining the key corresponding to the ID number specifying said original data storage system from said storage unit based on an assignment from said original data storage system, and transmitting to said original data storage unit information for a unique medium number assigned to a valid medium and an encrypted signature of the valid medium encrypted by using the key corresponding to the ID number specifying said original data storage system;

wherein said original data storage unit puts the signature of the valid medium in the non-falsified area of a storage medium according to information for the signature of the valid medium transmitted from said valid medium issuing unit, decrypts the document using the same key as the key obtained from the storage unit, and records the original data that includes time data and history data on the storage medium.

8. A valid medium management system, comprising:

a certified copy/duplicate storage unit storing a certified copy or a duplicate of an original data;

a storage unit storing a key corresponding to an ID number specifying said certified copy/duplicate storage unit; and a valid medium issuing unit obtaining the key corresponding to the ID number specifying said certified copy/duplicate storage system from said storage unit based on an assignment from said certified copy/duplicate storage system, and transmitting to said certified copy/duplicate storage unit information for a unique medium number assigned to a valid medium and an encrypted signature of the valid medium encrypted by using the key corresponding to the ID number specifying said original data storage system;

wherein said certified copy/duplicate storage unit puts the signature of the valid medium in a non-falsified area of a storage medium according to information for the signature of the valid medium transmitted from said valid medium issuing unit, decrypts the original data using the same key as the key obtained from said storage unit, and records a certified copy or a duplicate of the original data that includes time data and history data on the storage medium.

9. The system according to claim 7, wherein said original data storage system receives from the factory a storage medium which is assigned the unique medium number; and has the non-falsified area.

10. The system according to claim 8, wherein said certified copy/duplicate storage system receives from a factory the storage medium which is assigned the unique medium number and has the non-falsified area.

11. The system according to claim 9, wherein the signature of the valid medium recorded in the non-falsified area comprises the unique medium number and a certificate of the valid medium issuing system.

12. The system according to claim 10, wherein the signature of the valid medium recorded in the non-falsified area comprises the unique medium number and a certificate of the valid medium issuing system.

* * * * *